Aug. 4, 1925.
J. L. RESPESS
1,548,283
TRANSPLANTING TUBE
Filed Dec. 21, 1922
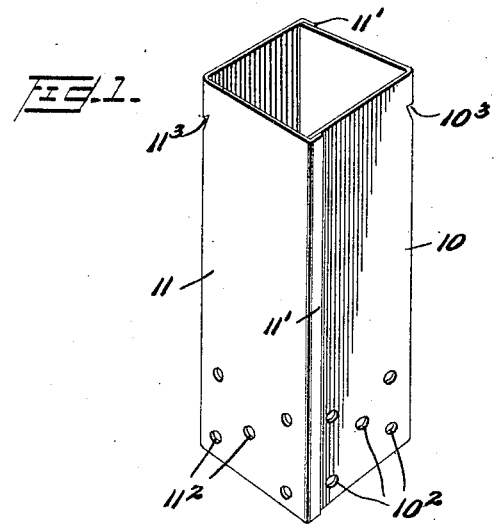
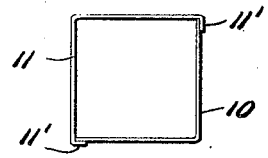
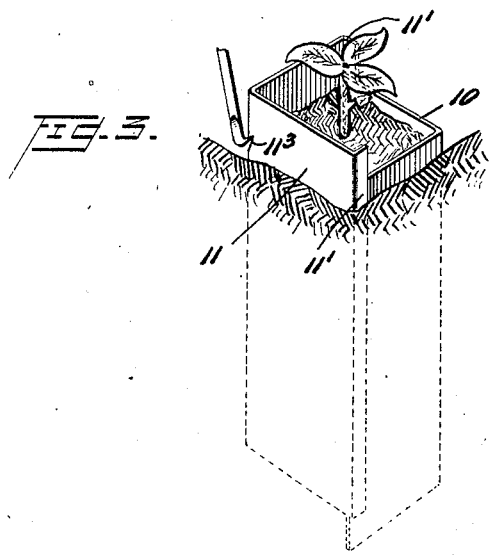
Inventor
James L. Respess,
By Watson, Coit, Morse & Grindle,
Attorneys.

Patented Aug. 4, 1925.

1,548,283

UNITED STATES PATENT OFFICE.

JAMES L. RESPESS, OF COLUMBIA, SOUTH CAROLINA.

TRANSPLANTING TUBE.

Application filed December 21, 1922. Serial No. 608,247.

*To all whom it may concern:*

Be it known that I, JAMES L. RESPESS, a citizen of the United States, and resident of Columbia, Richland County, State of South Carolina, have invented certain new and useful Improvements in Transplanting Tubes, of which the following is a specification.

The present invention relates to transplanting tubes for small plants and particularly to tubes for germinating cotton seed and for transplanting the cotton plants from a hothouse to the open field. Cotton plants are of such a nature that they cannot be transplanted apart from the soil surrounding them but if transplanted at all, must be accompanied by a considerable amount of the soil in which the roots are embedded. This is true of certain other plants and the present invention provides a means in which the seeds of such plants may germinate and the plant grow to considerable size and then be transplanted to the open field for continued growth to large size. The invention is particularly useful, however, in connection with cotton plants inasmuch as it provides an entirely practical means whereby cotton may be caused to bear fruit earlier in the season than is now possible and to escape the boll weevil, which pest first attacks the cotton about mid-summer. The device is in reality a combination flower pot and transplanting device and may be formed in various ways, one embodiment being illustrated in the drawings.

In the drawings:

Figure 1 is a perspective view of the device;

Figure 2 is a top plan view of the same; and

Figure 3 is a perspective view of the device showing the manner in which it is manipulated in the transplanting operation.

In the embodiment illustrated the device is shown to be formed of two pieces of tin, fiber, or other suitable material 10 and 11 which are substantially similar. Preferably each member is formed as an angle member so that when together a tube is formed of substantially square cross section. The member 11 has flanges 11' which extend around the edges of member 10 so that the parts cannot be separated except by sliding them relatively endwise. Holes $10^2$ and $11^2$ may be provided for ventilation purposes and notches $10^3$ and $11^3$ may be provided into which a hook or other tool may be inserted to effect relative longitudinal movement in the transplanting operation.

The device may be either square in cross section or may have any other cross sectional shape found desirable, but it will be observed that with devices of square cross section a large number may be arranged in an open box closely fitted together and without wasting any space.

In practice the devices are filled with earth and cotton seeds placed therein, in the early spring. A large number of the transplanting devices are seeded and kept under cover so that the cotton plants are say, three inches high, by the time that the weather has become sufficiently warm outside for the plants to thrive. The transplanting devices with the plants thus far developed are then carried to the fields and the plants placed in rows at the proper intervals.

The manner of using the tube in transplanting is shown in Figure 3. The device is buried, or placed in a furrow and the soil filled in around it, up to its top. A tool is then inserted into one of the notches $10^3$ or $11^3$ and one member of the device removed vertically upwardly. The second member of the device may then be also removed in the same manner without disturbing the plant and the soil which has been transplanted with it. If found necessary during the removal of the portions 10 and 11 a light pressure may be inserted by the fingers on the soil surrounding the plant so that it is not shaken up too severely. The operation is quickly accomplished and the transplanting tube is then stored away until the following season to be used again. The plants thus transplanted will readily grow if conditions are favorable and the bolls will mature before the boll weevil comes from the ground to attack them.

Having thus described the invention what is claimed as new and desired to be secured by Letters Patent is:

A transplanting device comprising an open ended tube formed of two sheet metal members substantially similar in cross section, the longitudinal edges of one member extending around and slidably engaging the corresponding edges of the other member whereby the members are held against lateral separation but may be disengaged by sliding one longitudinally relatively to the other, each member having means constituting a catch for facilitating such longitudinal separation.

In testimony whereof I hereunto affix my signature.

JAMES L. RESPESS.